United States Patent [19]

Elmaraghy et al.

[11] Patent Number: 4,549,456
[45] Date of Patent: Oct. 29, 1985

[54] NOISE DAMPING GUARD FOR CIRCULAR SAWS

[75] Inventors: Rachik Elmaraghy; Michel Fontaine, both of Ste-Foy, Canada

[73] Assignee: Centre de Recherche Industrielle du Quebec, Quebec, Canada

[21] Appl. No.: 530,063

[22] Filed: Sep. 7, 1983

[51] Int. Cl.⁴ .............................................. B26D 1/02
[52] U.S. Cl. .................................... 83/478; 83/477.2; 83/544; 181/205
[58] Field of Search ...................... 83/478, 664, 477.2, 83/544, 545, 546, DIG. 1; 144/251 R, 251 A; 181/205

[56] References Cited

U.S. PATENT DOCUMENTS

| | | | |
|---|---|---|---|
| 2,572,326 | 10/1951 | Evans | 83/544 |
| 2,593,596 | 4/1952 | Olson | 83/544 |
| 3,105,528 | 10/1963 | Loughridge | 83/477 |
| 3,540,334 | 11/1970 | McLauchlan | 83/13 |
| 3,812,752 | 5/1974 | Jaegers | 83/478 |
| 3,850,060 | 11/1974 | Wilcox | 83/13 |
| 3,918,334 | 11/1975 | Wilcox | 83/13 |
| 4,137,806 | 2/1979 | Segal et al. | 83/478 |

FOREIGN PATENT DOCUMENTS

| | | | |
|---|---|---|---|
| 996454 | 9/1976 | Canada . | |
| 1061222 | 8/1979 | Canada . | |
| 2057348 | 4/1981 | United Kingdom | 83/473 |

OTHER PUBLICATIONS

Noise-Con 79 Purdue University, West Lafayette, Indiana, M. Zockel, D. A. Bies & S. G. Page, Mechanical Engineering Department, University of Adelaide, Adelaide, S.A. 5000.

Primary Examiner—Frank T. Yost
Assistant Examiner—Hien H. Phan
Attorney, Agent, or Firm—Oblon, Fisher, Spivak, McClelland & Maier

[57] ABSTRACT

A noise damping guard for a circular saw blade of the type mounted for axial rotation relative to a material support plane disposed transverse to the cutting axis of the blade. The guard comprises a stationary lower guard section secured beneath the support plane and a pivoted upper guard section secured above the support plane. Each guard section comprises a guard frame supporting an inner pair of anti-friction metal plates secured in parallel-spaced relationship to one another to receive a saw blade therebetween and define an air gap between each side of the blade and an inner face of the metal plates. A spacer plate and a backing plate is secured to an outer face of each of the metal plates to prevent the vibration of the inner anti-friction metal plate and to provide an additional noise barrier and still further to maintain the metal plates in alignment. A pivoting support arm is secured to the guard upper section for upward displacement of the guard upper section.

7 Claims, 8 Drawing Figures

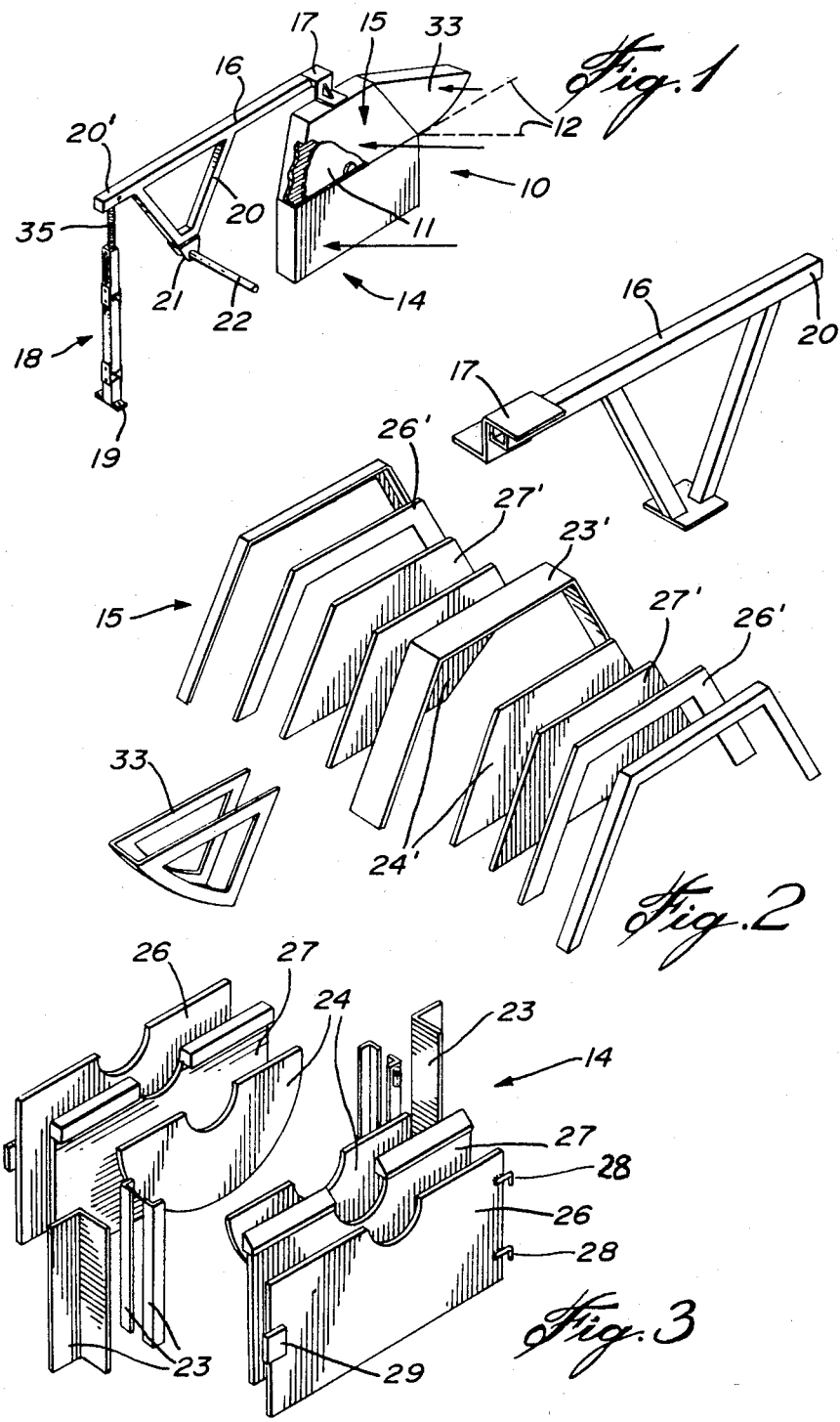

NOISE DAMPING GUARD FOR CIRCULAR SAWS

BACKGROUND OF INVENTION (a) Field of Invention

The present invention relates to an improved noise damping guard for a circular saw blade and wherein the guard walls are constructed of a sandwich material mounted in parallel relationship to each side of the blade and defining an air gap between the guard and the blade whereby to dampen blade vibration and noise and to substantially reduce blade heating when occasionally in frictional contact with the guard.

(b) Description of the Prior Art

In the prior art, such as in U.S. Pat. No. 4,137,806, there is disclosed a silencing mechanism for circular saws. The mechanism comprises a casing made of plastics and foam material whereby to absorb noise caused by a saw blade. The material utilized to effect such noise absorption is a foam material supported in a structural plastics guard frame. As disclosed in the patent, such guard was found to achieve noise reduction on 14, 16, and 18 inch blades, with the maximum noise reduction obtained being in the range of 10 to 11.4 db. However, the disadvantage of this noise damping guard is that when the blade vibrates or is forced to touch the side walls, the side walls will self-destruct or be severely damaged and the blade will heat up due to its contact with such vinyl-like material.

Heating of the blade, when in operation, also tends to soften the foam-like material and causes the retention and thus the build-up of sawdust between the saw blade and the side walls. This results in reducing the noise effectiveness of the silencing mechanism and in increased maintenance and repair to the guard and renders the saw inoperative. Often it is necessary to replace the guard if excessive wear is resulted from its contact with the vibrating saw blade.

It is a well known fact that noise in a saw blade is caused in large part by the vibrations in the blade. Due to the structural nature of the noise mechanism of the above prior art, the blade vibrations cannot be reduced effectively and noise attenuations is achieved primarily through the absorption characteristics of the foam-like material. Another major disadvantage, results from the potential damage or destruction of the noise mechanism walls if a piece of hard material happens to be forced or squeezed in the gap between the saw blade and the guard.

SUMMARY OF INVENTION

It is a feature of the present invention to provide an improved noise damping guard for circular saw blades which guard substantially overcomes the above-mentioned disadvantages of the prior art.

Another feature of the present invention is to provide a noise damping guard for circular saw blades and wherein the noise damping is effected by a sandwich material closely spaced to the saw blade side walls thus destroying a major part of the blade vibratory energy at the source.

Another feature of the present invention is to provide a noise damping guard for circular saw blades wherein the noise damping is effected by a sandwich material possessing high transmission loss and barrier characteristics.

Another feature of the present invention is to provide a noise damping guard for circular saw blades wherein the noise damping mechanism is effected by a stiff and composite material capable of withstanding the effects of blade contact or the occasional presence of a hard material like a piece of wood squeezed in the gap between the blade and the guard without losing its structural or acoustical performances.

Another feature of the present invention is to provide a noise damping guard for circular saw blades of the type mounted for axial rotation relative to a material support plane disposed transverse to the cutting axis of the blade and which guard comprises a stationary lower guard section secured beneath the support plane and a pivoted upper guard section secured above the support plane and wherein a counter-weight mechanism is secured to the upper guard section.

According to the above features, from a broad aspect, the present invention provides a composite noise damping guard for a circular saw blade of the type mounted for axial rotation relative to a material support plane disposed transverse to the cutting axis of the blade. The guard comprises a stationary lower guard section secured beneath the support plane and a pivoted upper guard section secured above the support plane. Each guard section is comprised by a guard frame supporting an inner pair of anti-friction brass plates secured in parallel-spaced relationship to one another to receive a saw blade therebetween. The brass plates are capable of withstanding the effects of blade contact when the blade vibrates. An air gap between each side of the blade and an inner face of the brass plates. A backing plate is secured in flush contact to an outer face of each of the brass plates to maintain the brass plates in alignment. Means is also provided to detachably secure the brass plates from the backing plates. A pivoting support arm is secured to the guard upper section for upward displacement of the guard upper section.

BRIEF DESCRIPTION OF DRAWINGS

The present invention will now be described with reference to the accompanying drawings in which:

FIG. 1 is a perspective view of the noise damping guard secured to a support arm and a cantilever mechanism;

FIG. 2 is an exploded view showing the construction of the upper guard section;

FIG. 3 is an exploded view showing the construction of the lower guard section;

DESCRIPTION OF PREFERRED EMBODIMENTS

Figure 5:
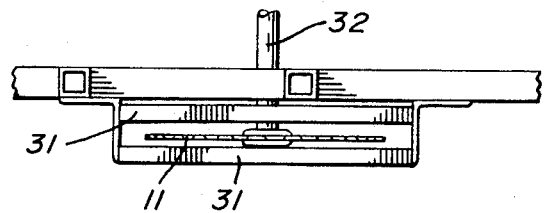
FIG. 5 is a section view showing the securement of the lower guard section relative to a conveyor frame.

Referring now to the drawings, and more particularly to FIGS. 1 to 4, there is shown generally at 10 the noise damping guard of the present invention as utilized on a circular saw blade 11 which is secured to a drive shaft 32, shown in FIG. 5, for rotation of said blade relative to a material support plane 12 on which a material 13 (see FIG. 6) to be cut is conveyed or supported.

The noise damping guard comprises a stationary lower guard section 14 secured beneath the support plane 12 and a pivoted upper guard section 15 secured above the support plane. The upper guard section 15 is secured to a pivoting support arm 16 having a forward end clamp 17 securing the arm to the upper guard section. A counterweight mechanism 18 is secured at its lower end 19 to a stationary member (not shown) and has its upper end 35 secured to a free end 20' of the pivoting support arm 16. A connecting frame 20 is secured to the arm 16 and supports a bearing 21, in its lower end, to pivotally secure the arm 16 to a pivot shaft 22.

As shown in FIGS. 2 and 3, each of the guard sections 14 and 15 are provided with a guard frame 23 for the lower guard sections 14 and 23' for the upper guard section 15. The frame 23, 23' supports the noise damping structure which is comprised by an inner pair of anti-friction metal plates 24, 24' secured in parallel-spaced relationship to one another and to the frame to receive a saw blade 11 therebetween (see FIG. 4). These metal plates 24, 24' are closely spaced to respective opposed side walls of the blade 11 and define an air gap 25 between each side of the blade and an inner face of the metal plates 24.

A backing plate 26 or backing frame 26' is secured to an outer face of each of the metal plates to maintain the metal plates in alignment.

Figure 4:
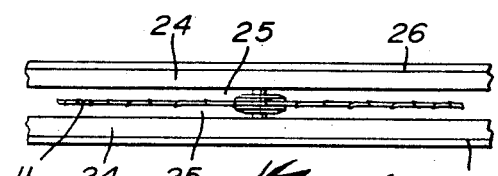
FIG. 4 is a section view showing the location of the metal plates of the guard relative to a saw blade.

As shown in FIGS. 3 and 4 there is further provided a spacer plate 27, 27' between the metal plates and the backing plates or frame, the said spacer plate 27, 27' being constructed of polyethylene plastic. The spacer plates are preferably ¾ of an inch in thickness and the metal plates 24, 24' are ¼ inch in thickness. Also these metal plates 24, 24' are constructed of brass material whereby not to damage the saw blade when in frictional contact therewith. Also such material has been found preferable as it does not cause overheating of the saw blade when in frictional contact therewith.

It can be seen from FIG. 3 that the backing plates 26 of the lower guard section 14 are provided with a hinge connection 28 along an edge thereof. A toggle clamp 29 is provided adjacent the other edge thereof whereby the outer metal plates and their interconnected inner metal plates 24 and spacer plates 27 are quickly removable from their position against the saw blade for quick access thereto. Also, it is preferable that the inner metal plates 24 be spaced from the saw blade a preferred distance to obtain maximum noise damping. For the lower guard section this spacing has been found to be 1/16 of an inch whereas with the upper guard section a 3/16 inch in width provides improved noise damping.

Figure 6:
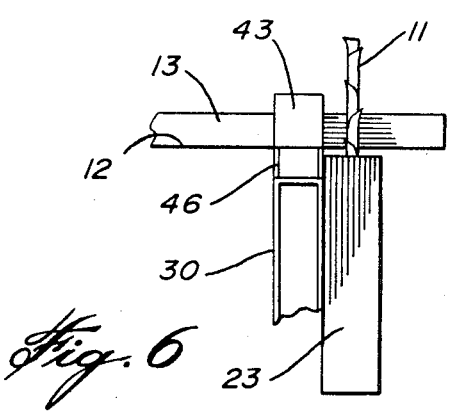
FIG. 6 is an end view showing the location of the lower guard section relative to the conveyor frame.

FIGS. 5 and 6 show the mounting of a lower guard section relative to a conveyor chain frame 30. As herein shown, the guard frame 23 is secured to the conveyor chain frame 30 with the noise damping plate assemblies 31 to each side of the saw blade 11. The blade is rotated by the drive shaft 32.

Figure 7:
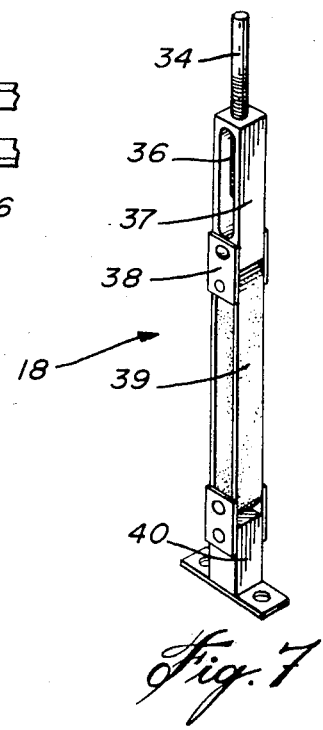
FIG. 7 is a perspective view of the counterbalance mechanism.

Referring again to FIGS. 1 and 2 it can be seen that the upper guard section is provided with a forward guard lifting arm 33 secured in the lower front edge of the upper guard support frame 23'. This arm 33 causes the upper guard section 15 to move upwardly on the pivot connection of the support arm 16. However, in order to provide for ease of lifting of this heavy upper guard section there is provided the counter-weight mechanism 18. This counter-weight mechanism is illustrated in detail in FIG. 7 and comprises a connecting arm 34 which is secured at a top end 35 for free axial rotation in the free end 20 of the support arm 16. The lower end 36 of the arm 34 is threadably adjustable in a top end of a coupling arm 37. The coupling arm is connected through coupling 38 to a tension element 39 which might be a heavy duty elastic band. The lower end of the band is secured to a suitable attachment plug 40 which is immovably securable to a stationary surface. It can be seen that by threadably adjusting the connecting arm 34, the tension in the band 39 will increase or decrease whereby to adjust the necessary upward force exerted on the upper guard section by the band to permit easy lifting of the guard when a piece of lumber 13 is brought in abutment against the guard lifting arm 33.

Tests were conducted in order to determine the minimum spacing distance between the inner metal plates 24 and the saw blade 11 to obtain maximum sound attenuation. A 24 inch blade commonly used in saw-mills was used to conduct the testing work. Three aspects of the construction of the guards were studied in order to obtain the best results and namely, (a) the speed of rotation (rpm) of the blade, (b) the play between the inner side wall of the inner plates 24 and the saw blade, and (c) the noise level in (dbA) without damping guards. The noise level at idling conditions (rpm) is indicated by the curve No. 1 on FIG. 8 of the drawings. Each of curves 1 to 7 on FIG. 8 represent the arrangement as set forth in the Table which follows.

Figure 8:
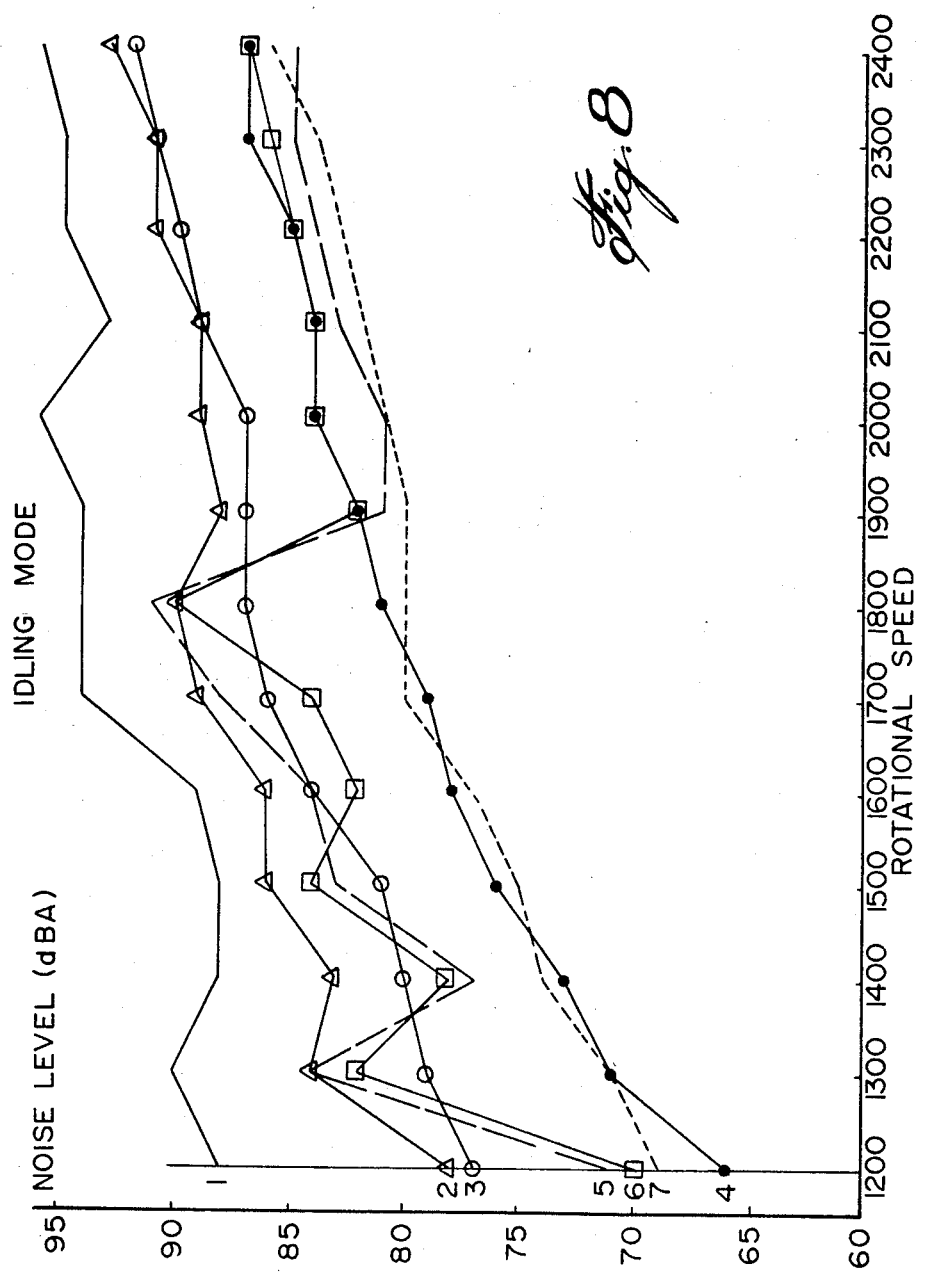
FIG. 8 is a graph illustrating noise attenuation in (dbA) at various air gap dimensions and speed of rotation in (rmp).

| TABLE OF LEGENDS OF CURVES SHOWN IN FIG. 8 | | |
|---|---|---|
| CURVE | LEGEND | DESCRIPTION |
| 1 | ——— | Saw without guard |
| 2 | —△— | Saw + lower guard + ⅛" air gaps |
| 3 | —⊙— | Saw + upper guard + 1/16" air gaps |
| 4 | ○ | Saw + lower guard ¼" air gaps and upper guard ¼" air gaps |
| 5 | — — | Saw + lower guard ⅛" air gaps and upper guard 3/16" air gaps |
| 6 | —■— | Saw + lower guard 1/16" air gaps and upper guard ¼" air gaps |
| 7 | - - - - | Saw + lower guard 1/16" air gaps and upper guard 3/16" air gaps |

With reference to FIG. 8, it can be observed that the noise levels emitted are attenuated in dependence to the spacing between the inner metal plates 24 and the saw blade, that is to say, by the width of the air cushion 25 on each side of the blade. It has been surprisingly found that the use of metal plates provides excellent attenuation and further does not cause damage to the guard in a situation where the saw blade vibrates excessively and is in frictional contact with the inner metal plates.

It was also observed that without the noise damping guard, and the saw blade rotating at a certain speed in the idling mode, it emitted a sound of 95 dbA. When the saw blade was used to cut a piece of lumber, i.e. in the cutting mode was found to emit a noise of 104 dbA. The same test with the noise damping guard provided results of 85 dbA at idling and 96 dbA in the cutting mode.

It is also foreseen that with the construction of the noise damping guard as described herein that the side walls of the guard may be secured for adjustability whereby to accommodate saw blades of different widths and maintain the proper dimension of the air cushions or gaps to each side of the blade to achieve maximum sound attenuation. Also, although the inner plates are herein described as being constructed from brass, which is a material less resistant than steel, other types of material may be used which can provide similar results to minimize blade damage and heating.

As stated above, the noise damping guard of the present invention provides 10 to 12 dbA of attenuation in the idling mode and 8 to 10 dbA of attenuation in the cutting mode. This is of course a function of the rotating speed (rpm). Also the guard of the present invention is easy to install, easy to use, requires very little maintenance as compared to known saw guards of the prior art, does not provide any inconvenience to the user, offers extra protection for the operator and is adaptable to various types of circular saws.

It is within the ambit of the present invention to cover any obvious modifications thereof provided such modifications fall within the scope of the appended claims.

We claim:

1. A composite noise damping guard for a circular saw blade of the type mounted for axial rotation relative to a material support plane disposed transverse to the cutting axis of said blade; said guard comprising a stationary lower guard section secured beneath said support plane and a pivoted upper guard section secured above said support plane; each said guard sections being comprised by a guard frame supporting an inner pair of anti-friction brass plates secured in parallel-spaced relationship to one another to receive a saw blade in close spacing therebetween, said brass plates being capable of withstanding the effects of blade contact when said blade vibrates, an air gap defined between each side of said blade and an inner face of said brass plates, a backing steel plate secured to said brass plates through said guard frame to maintain said brass plates in alignment, a spacer plate of plastics material removably secured in flush facial contact between said brass plates and said backing plate, means to detachably secure the brass plate from the backing plates whereby said brass plates, spacer plates and backing plates are separable from one another; and a pivoting support arm secured to said guard upper section for upward displacement of said guard upper section.

2. A noise damping guard as claimed in claim 1 wherein said backing steel plates of said lower guard section are hinged along an edge thereof to said guard frame, a toggle clamp along an opposed edge of said hinged plate, one of said brass plates and its associated spacer plate being secured to said hinged outer steel plate to provide quick access to said blade.

3. A noise damping guard as claimed in claim 1 wherein said guard provides 10 to 12 db noise damping in the idling mode of said saw and 8 to 10 db during the cutting mode of said saw.

4. A noise damping guard as claimed in claim 3 wherein each said air gap in said lower guard section is 1/16 of an inch in width, each said air gap in said upper guard section being 3/16 of an inch in width.

5. A noise damping guard as claimed in claim 1 wherein a counterweight mechanism is secured to a free end of said pivoting support arm, said mechanism having a connecting arm secured at one end to said free end of said support arm and secured at an opposed end to a tension element whereby an upward force is applied to said upper guard to permit easy upward displacement of said upper guard section on said cutting axis.

6. A noise damping guard as claimed in claim 5 wherein said connecting arm is threadably secured to a coupling arm secured to said tension element whereby to adjust the pulling force of said tension element to apply an upward force on said upper guard section.

7. A noise damping guard as claimed in claim 6 wherein said upper guard is further provided with a forward guard lifting arm to effect said upward displacement of said upper guard by a material to be cut displaced thereagainst on said support plane.

* * * * *